(12) United States Patent
Hargather et al.

(10) Patent No.: US 12,104,558 B1
(45) Date of Patent: Oct. 1, 2024

(54) ADDITIVELY MANUFACTURED ROCKET FUEL GRAINS AND COMPETITIVE SIMULATION OF THE SAME

(71) Applicant: X-Bow Launch Systems Inc., Albuquerque, NM (US)

(72) Inventors: Chelsey Hargather, Socorro, NM (US); Mark Kaufman, Auburn, CA (US); Michael McPherson, Socorro, NM (US); Jillian Marsh, Austin, TX (US); Matthew Hinton, Socorro, NM (US); Dane Fradenburg, Socorro, NM (US); Maureen Gannon, San Francisco, CA (US); Jason Hundley, Albuquerque, NM (US); Michael Hargather, Socorro, NM (US)

(73) Assignee: X-Bow Launch Systems Inc., Albuquerque, NM (US)

( * ) Notice: Subject to any disclaimer, the term of this patent is extended or adjusted under 35 U.S.C. 154(b) by 0 days.

(21) Appl. No.: 18/581,297

(22) Filed: Feb. 19, 2024

Related U.S. Application Data

(63) Continuation of application No. 17/325,565, filed on May 20, 2021, now Pat. No. 11,913,410.
(Continued)

(51) Int. Cl.
*F02K 9/24* (2006.01)
*B29C 64/314* (2017.01)
(Continued)

(52) U.S. Cl.
CPC .............. *F02K 9/24* (2013.01); *B29C 64/314* (2017.08); *B29C 64/371* (2017.08);
(Continued)

(58) Field of Classification Search
CPC ... B64G 1/404; F02K 9/10; F02K 9/18; F02K 9/24; F02K 9/28; F02K 9/72; B29C 64/386
See application file for complete search history.

(56) References Cited

U.S. PATENT DOCUMENTS 10,286,599 B2 * 5/2019 Jones ..................... B33Y 70/10
10,303,159 B2 * 5/2019 Czinger ................. B33Y 50/00
(Continued)

*Primary Examiner* — Kyle Robert Thomas
(74) *Attorney, Agent, or Firm* — Temmerman Law; Mathew J. Temmerman

(57) ABSTRACT

A method of making a fuel grain for use in a rocket motor, the method comprising blending a first energetic nanoscale metallic compound and a second compound suitable to form a feedstock material for use in an additive manufacturing apparatus, the additive manufacturing apparatus operatively connected to a computing system, that provides additive manufacturing printing instructions to the additive manufacturing apparatus, permitting construction of an autonomously designed and optimized rocket fuel grain section; wherein the stochastic deposition simulation-assisted fuel grain geometries further comprise a plurality of agglutinated layers of solidified fuel grain compound, each layer of the plurality of layers comprising a plurality of blended and radially displaced beads of different radii, said radial displacement optionally optimized via competitive simulation programs, and wherein the system continuously mixes constituent materials in an inline/static mixer, with viscosity controlled via particle size variations, and material is deposited in a controlled atmosphere or vacuum.

20 Claims, 4 Drawing Sheets

Related U.S. Application Data

(60) Provisional application No. 63/049,056, filed on Jul. 7, 2020, provisional application No. 63/027,887, filed on May 20, 2020.

(51) Int. Cl.

| | |
|---|---|
| *B29C 64/371* | (2017.01) |
| *B29C 64/386* | (2017.01) |
| *B33Y 10/00* | (2015.01) |
| *B33Y 40/00* | (2020.01) |
| *B33Y 50/00* | (2015.01) |
| *B33Y 70/10* | (2020.01) |
| *B33Y 80/00* | (2015.01) |
| *F02K 9/10* | (2006.01) |
| *F02K 9/18* | (2006.01) |
| *F02K 9/72* | (2006.01) |
| *B29K 55/02* | (2006.01) |
| *B29L 31/20* | (2006.01) |

(52) U.S. Cl.
CPC ............ *B29C 64/386* (2017.08); *B33Y 10/00* (2014.12); *B33Y 40/00* (2014.12); *B33Y 50/00* (2014.12); *B33Y 70/10* (2020.01); *B33Y 80/00* (2014.12); *F02K 9/10* (2013.01); *F02K 9/18* (2013.01); *F02K 9/72* (2013.01); *B29K 2055/02* (2013.01); *B29L 2031/20* (2013.01); *F05D 2220/80* (2013.01); *F05D 2230/30* (2013.01)

(56) References Cited

U.S. PATENT DOCUMENTS

| | | | |
|---|---|---|---|
| 10,744,598 B2 * | 8/2020 | Hall | B23K 26/034 |
| 2013/0042596 A1 * | 2/2013 | Fuller | C06B 45/00 |
| | | | 118/696 |
| 2018/0156159 A1 * | 6/2018 | Adriany | F02K 9/44 |

* cited by examiner

ADDITIVELY MANUFACTURED ROCKET FUEL GRAINS AND COMPETITIVE SIMULATION OF THE SAME

RELATED APPLICATIONS

This application is a continuation of U.S. nonprovisional patent application Ser. No. 17/325,565, filed May 20, 2021 and now granted as U.S. Pat. No. 11,913,410 on Feb. 27, 2024, and which claims priority from the United States provisional application with Ser. No. 63/027,887, which was filed on May 20, 2020, and from the United States provisional application with Ser. No. 63/049,056, which was filed on Jul. 7, 2020. The disclosure of each provisional application is incorporated herein as if set out in full.

STATEMENT REGARDING FEDERALLY SPONSORED RESEARCH OF DEVELOPMENT

Portions of the invention described herein were made under a contract with an agency of the United States Government. The name of the U.S. Government agency and Government contract number are: US ARMY ACC-APG-RTP W911NF, Contract no. W911NF19C. The government may have certain rights in the inventions disclosed herein.

TECHNICAL FIELD

The present invention relates to a competitive simulation-assisted additively manufactured rocket fuel grain and methods for manufacturing the same. The resultant thermoplastic rocket fuel grain encases a center flow port enabling circumferential thrust and dampened vortex flow in use. In some examples, the fuel grain is formed as a plurality of agglutinated beaded structures of heterogenous radii. Competitive simulations enable optimization of various rocket fuel grain and rocket motor/rocket engine operation parameters.

BACKGROUND

The 3D-printed rocket motors and gas generators described herein generally encompass propulsion technologies utilizing a pressurized oxidizer stored in a liquid or gaseous state, and a solid fuel. Prior art systems include both hybrid rocket engines (HRE), liquid rocket engines (LRE), and solid rocket engines (SRE). Reverse hybrid engines (RHE), where the oxidizer is stored in a solid state have also been described but are much less common. The below background will focus on HREs due to their expanding relevance in addition to their many distinct advantages over purely liquid or solid systems, including overall simplicity, safety, improved operability, performance, and cost. In addition, the concepts described covering prior art HRE systems are broadly applicable, often encompassing SREs, LREs, RHEs, and other related systems. Notably, the term "engine" and "motor" are used interchangeably herein.

The advent of additive manufacturing technology has enabled new methods of designing and manufacturing rocket fuels with much more complex geometries. Using additive manufacturing, for example, hybrid fuel chambers can be designed and printed to include complex chamber geometries that were previously too difficult or impossible to achieve with traditional casting methods. Recent publications demonstrate the use of complex chambers geometries resulting in significant performance increases.

There are several types of additive manufacturing processes that can be used to manufacture fuels. A few common processes include Fused Deposition Modeling (FDM), Selective Laser Sintering (SLS), Stereolithography (SLA), and Laser Spray Modeling (LSM). Relatedly, a laser spray nozzle assembly is described in U.S. Pat. No. 4,724,299. This assembly includes a nozzle body, a housing, a cladding powder passage, and a cladding powder supply system that is operably associated with the passage such that the powder exits the opening coaxial with a laser beam. Notably, while FDM, SLS, SLA, and LSM processes represent some of the most common and most inexpensive forms of additive manufacturing, in many cases these processes provide for inferior compound densities, limited scaling capabilities, poor repair capabilities, mechanical joint limitations, and/or machinability issues.

Prior art methods and processes are further known to produce excessive fabrication waste, require excessive labor, expend excessive energy and, in general, suffer from diminished production efficiencies. Prior art fabrication and manufacturing methods also typically alter the coefficient of thermal expansion, thereby introducing heterogeneity into thermal expansion rates, causing stress fractures, cracks and compound fatigue such as bending or bowing. Further, there is a need for optimizing contact surface areas in order to maximize thermal energy transfer, reduce compound requirements and thereby also reduce weight requirements. Finally, there is a need for 3D fabrication with capabilities of the highest thermal effectiveness, highest temperature allowances, highest pressure allowances, highest compactness, highest erosion resistance, and highest corrosion resistance.

Prior Art Fuel Chamber Designs

Recent studies have investigated a variety of performance enhancing geometries and have demonstrated significant increases in regression rates compared to simple straight chamber geometries. Each of said geometries utilizes a different technique to manipulate the oxidizer flow. A first prior art example concerns a composite fuel system utilizing a printed acrylonitrile butadiene styrene (ABS) tabulator structure cast with paraffin. Regression rates for the turbulator were measured using conventional methods. In this case, the added turbulator was shown to increase regression rates by an average of 35%, although a small sample size of testing was performed.

In a related publication, star swirl fuel chamber designs using an acrylic fuel and gaseous oxygen were employed, achieving regression rates of an average of 250% greater over the standard cylindrical straight chamber design. This effect was seen to increase with each turn per inch for each swirl design tested.

Additional star swirl chambers are known in the art that utilize ABS (acrylonitrile butadiene styrene) and $N_2O$ (nitrous oxide). The related publications describe notable increases in regression rates over straight chambers for similar oxidizer mass fluxes. Further, these publications demonstrate a potential regression rate increase of up to 67% for the star swirl over straight chamber designs, however, the system also did slightly decrease the combustion efficiency by as much as 15% for some tests.

Relatedly, a study investigating the performance of a helical swirl design to enable larger fuel surface burning area without increasing the length of the fuel grain involved the printing of helical fuels in ABS and the oxidizer was $N_2O$. The helical swirl design increased regression rates by up to 130% when compared with straight chamber fuels at the same oxidizer flux. For post burn regression analysis, the researchers first sectioned the fuel, then the cross sections were imaged to recreate a computerized mesh of the burned grain. The average radius was then calculated to obtain the average regression rate for the burn.

Conventional cast manufactured hybrids have made use of performance enhancing additives in their formulations. These additives can increase regression rates through enhanced radiation, enhanced heat transfer, as well as increased density. One prior art system has shown that the regression rate of HTPB (hydroxyl-terminated polybutadiene) with GOX (gaseous oxygen) oxidizer can be increased by the inclusion of 5% (by weight) 100 nm sized aluminum particles.

It is known that particle size is a key factor in performance enhancement. Micron sized particles increase regression rates by enhancing the radiation heat flux from the combustion flame to the fuel surface. Nano-scale aluminum particles additionally have lower ignition temperatures and higher specific area, releasing energy closer to the surface.

Relatedly, it has been shown that the use of Lithium aluminum hydride (LiAlH4, LAH) and Magnesium hydride (MgH2, MGH) nanoparticles significantly increases the regression rate of a paraffin-based fuel used with a gaseous oxygen oxidizer. Further, an increase in performance using a mixture comprised of pure HTPB with a 10% Al—Cu powder composition has demonstrated an increase in regression rate of up to 37% compared to the standard HTPB fuel.

Prior Art Fuel Grain Structures

Additive manufacturing of hybrid fuels has also enabled the design of hollow grain structures which can then be filled with another fuel. The printed structure can be designed as a matrix that releases pockets of the supplemental fuel. The secondary, tertiary, and quaternary fuels may have increased performance properties and their use is enabled by the printed grain structure. In addition, thrust profiles can be improved by custom tailoring fuel formulations such that the fuels burn through various sections of varying energy densities.

It has been shown that a printed grain matrix structure may be filled with powdered fuels such as coal, graphite and/or aluminum. The completed fuel may be roughly 50% ABS and 50% powdered fuel by volume. Voids may be optimized to achieve maximum powdered fuel mass while ensuring the ABS structure does not prematurely collapse. This publication described meaningful increases in thrust levels in addition to novel 3D-printable components. A related technique which utilizes a printed grain structure that releases liquid fuel rather than powdered fuel has been stated to potentially increase regression rates by up to 100%.

Additional techniques for achieving performance increases have also been explored. These include using a swirl injector and mixing additives injected into the cast fuel. Some work has also been done exploring the effect of blending these techniques along with complex fuel chambers. In some cases, this has led to additional performance increases in regression rates. For example, the turbulator grain design can be combined with a paraffin/aluminum fill mixture, in addition to a swirl oxidizer injector, in order to increase regression rates.

Prior Art 3D Printing and Testing Capabilities

Additive manufacturing (AM), or 3D printing, refers to a variety of different processes. The most common method of AM for printing complex fuel chambers in recent studies has been fused deposition modeling (FDM). In the FDM process, the fuel is printed layer by layer. In the FDM process, a roll of polymeric filament is continuously fed through a hot end, which melts the compound and bonds the compound to the previous layer. Once a layer is completed, the extruder raises to complete the next layer. This process repeats for each layer until the final layer is deposited.

Advantages of FDM include low cost, ease of use and the availability of open source hardware and software. Ideal FDM printers are capable of printing very fine structures, for example, ABS fuel filaments. ABS has a high print temperature of 210 degrees Celsius, and requires a controlled thermal environment to prevent warping. In addition, heated beds are necessary to ensure that the ABS will adhere to the build plate and maintain sufficient temperature to prevent premature cooling and warping.

In one example, the MakerBot 3D printer from Johnson and Johnson 3D Printing Laboratory may be used, but it does not contain heated beds and is limited to printing PLA filament. Therefore, a dedicated 3D printer for producing ABS fuels is often preferable. For example, a Creality Ender 3 with a glass heated bed is known in the art to print the ABS fuels and ABS-type fuels with high efficiency.

Indeed, in recent years AM has been implemented in the printing of rocket components using the above components, and the like. AM has enabled design of fuel grains with complex chamber geometries which are not possible or very difficult to achieve through conventional casting techniques. These geometries can be used to manipulate the oxidizer flow and interactions with the fuel to increase performance of the engine. Indeed, some recent studies using a variety of performance enhancing geometries have shown significant regression rate increases. Prior art examples include but are not limited to hot-fire experiments of printed fuels in addition to additive manufacturing techniques for ABS Aluminum complex chamber fuels grain, the later resulting in successful tests for a 3D printed ABS Aluminum hybrid rocket fuel grain.

Although recent developments in additive manufacturing are promising, as described above there are many geometries and configurations that remain unexplored. Performance enhancing mechanisms are largely unknown or under development, and much exploration will be required to perfect fuel grain designs, demonstrate reliability, and explore potential new geometries.

SUMMARY OF THE INVENTION

The present invention relates to a competitive simulation-assisted additively manufactured rocket fuel grain and related manufacturing methods. The resultant thermoplastic rocket fuel grain encases a center flow port enabling circumferential thrust and dampened vortex flow in use. In some examples, the fuel grain is formed as a plurality of agglutinated beaded structures of heterogenous radii. Competitive simulations comprise game theory framework applications, stochastic deposition simulations, and other related applications. Competitive simulations enable user optimization of various rocket fuel grain and rocket motor operation parameters including improved fuel grain architecture and rocket aerodynamics.

Methods are provided herein for making a fuel grain for use in a rocket motor. These methods include blending a first energetic nanoscale metallic compound and a second compound suitable as a rocket fuel according to a predetermined mixture ratio to form a third feedstock material. In one example, a first energetic nanoscale metallic compound comprises tungsten, magnesium, copper oxide, copper, titanium, and/or aluminum. Also provided are additional methods of making a fuel grain, including blending a first energetic nanoscale metallic compound and a second compound suitable as a rocket fuel. In other embodiments, the first energetic nanoscale metallic compound may be used in combination with a non-metal-based fuel, said non-metal-based fuel comprising a clean-burning fuel.

Also provided herein are Acrylonitrile Butadiene Styrene (ABS) thermoplastics having a prearranged monomer composition. Typically, a predetermined mixture ratio is mixed with a third compound and/or a blended ABS thermoplastic with polymer-infused nanocomposite aluminum powder. In one example, a first compound comprises 95% by mass ABS thermoplastic and the second compound comprises 5% by mass polymer-infused nanocomposite aluminum powder.

In some embodiments, a second compound comprises a plurality of nanoscale elemental aluminum core particles encapsulated by a cap of oligomer polymer. Further provided is a second compound including a polymer-infused nanocomposite aluminum powder. Also provided is a second compound with a temperature maintained below: a heat deflection temperature, melting temperature, and ignition temperature of the second compound.

The feedstock material is formed by successive drying and heating of the feedstock, wherein said heating and physical manipulation of the feedstock causes an increase in internal friction and consequent further elevation of the feedstock temperature. In some embodiments, successive drying and heating of the feedstock produces a preestablished viscosity that is highly adapted to use in an additive manufacturing apparatus.

In one embodiment, an additive manufacturing apparatus is operatively connected to a computing system configured to perform competitive simulations. Competitive simulation applications are provided, such as instruction sets and subroutines of a competitive simulation computer program. In one embodiment, the instruction sets and subroutines are stored on a storage device and coupled to a computer, and said instruction sets and subroutines are executed by one or more processors and one or more memory architectures provided within said computer. In one embodiment, competitive simulations further comprise game theory framework applications, wherein one or more variables are modified based on game theory to find equilibrium solutions for competing and/or cooperating metrics.

The present invention further comprises competitive simulations including stochastic deposition simulations, said stochastic deposition simulations producing optimized rocket fuel grains. In some embodiments, said rocket motor operation parameters improved by competitive simulation include at a minimum hybrid fuel grain design, solid fuel grain design, and rocket flight aerodynamics. In other embodiments, deposition simulations are executed using one or more Graphical Processing Units. In other embodiments, stochastic deposition simulations are displayed using three-dimensional graphical rendering.

In other embodiments, permeable fuel grain pores are spatially deposited within the rocket motor as determined by a stochastic deposition simulation. In some examples, an additive manufacturing apparatus deposits and blends deposition beads according to a stochastic deposition simulation. Similarly, additive manufacturing apparatus instructions may be generated by any competitive simulation. Also provided are permeable fuel grain pores embedded in a rocket fuel grain, said pores being modeled before construction via competitive simulation. Alternately, said pores may be modulated in size and position during use via user-controlled sensors.

In other embodiments, a user may input "user-generated stochastic simulation limitations" ("UGLs") permitting a user to modify stochastic deposition simulation instructions. In one example, a UGL allows a user to introduce predetermined spatial boundaries into a stochastic deposition simulation. In particular, UGLs enable the input of spatial limits during competitive simulation resulting in an altered fuel grain architecture.

In one example, stochastic deposition simulations are limited to deposition of fuel grain material along the external circumference of the central flow port, creating a circular fuel grain sheath. Notably, the resultant fuel grain sheath can produce "circumferential thrust", said circumferential thrust modulating rocket motor vortex flow via decreasing vortex flow. It is shown herein that said modulation of vortex flow may offer a novel means for in-flight control of additively manufactured rocket motors.

Also provided are rocket fuel grains including agglutinated layers of solidified fuel grain forming a plurality of substantially concentric beads of heterogenous radii. In some embodiments, agglutinated layers are embedded with electrochemical sensors or permeable fuel grain pores that may be modulated remotely to improve ballistics. In other embodiments, electrochemical sensors permit monitoring and modification of incendiary fluid flux and oxidizer flux such that the user may monitor fuel consumption while the rocket motor is in use. Also provided is a center flow port comprising a circular shape, an oval shape, a polygonal shape, a quatrefoil shape, a star shape, and/or an irregular shape.

In some embodiments, a fuel grain sheath is embedded with electrodes and sensors, facilitating rocket motor launch procedures and real-time monitoring of rocket flight. Particular examples of said sensors include LIDAR sensors, accelerometers, encoders, cameras, radar elements, GPS elements, acoustic elements, and/or magnetic sensor elements. In other embodiments, stochastic deposition simulations are adapted to optimize the design and real-time modulation of said electrodes and sensors.

It is a first objective of the present invention to leverage competitive simulation computer programs for enhancement of rocket fuel grain designs It is another objective of the invention to leverage competitive simulations to improve rocket motor ballistics profiles.

It is an additional objective of the invention to utilize stochastic deposition simulations in order to improve rocket fuel grain efficiency and safety.

It is an additional objective of the invention to modify the solid loading parameters via particle size distributions in order to reduce overall viscosities encountered during pumping in an additive manufacturing system.

It is another objective of the invention to enable embedded sensors to be integrated into said fuel grains, particularly fuel grain shapes subjected to user-generated limitations, thereby enhancing adaptability and range of said additively manufactured rocket motors.

It is yet another objective of the invention to permit UGLs such as spatial simulation boundaries such that dampened vortex flow from a rocket motor results.

These and other advantages and features of the present invention are described with specificity so as to make the present invention understandable to one of ordinary skill in the art.

The foregoing and other objects and features of the disclosure will become more apparent from the following detailed description, which proceeds with reference to the accompanying figures.

DETAILED DESCRIPTION OF THE INVENTION

The present invention is a competitive simulation-assisted additively manufactured rocket fuel grain and methods for manufacturing the same. It is disclosed herein that novel solid and/or hybrid rocket propellant grain structures may be autonomously designed and optimized via said simulations. In embodiments, the fuel grain is formed as a plurality of agglutinated beaded structures of heterogenous radii. It is shown herein that the disclosed thermoplastic rocket fuel grain provides circumferential and/or axial rocket motor thrust and a consequential dampened vortex flow. Also provided are competitive simulation programs such as game theory programs and stochastic deposition programs that enable optimization of several rocket motor operation parameters.

In general, the present invention is directed to competitive simulation assisted thermoplastic rocket fuel grains and methods of making the same, wherein said simulations are intended to contemplate a broad swath of computer programs. Particular examples of competitive simulations (also referred to herein as "simulations") include game theory computer programs and stochastic deposition simulations, as discussed in great detail below. It is shown herein that rocket motor fuel grains and fuel grain construction systems represent rapidly evolving technologies, and therefore the discussion herein is of ancillary relevance to various topics including: three-dimensional printable propulsion technologies, solid propellant materials, methods of producing propellants, and rocket construction platforms. In some embodiments, the present invention relates to both solid rocket motors, hybrid rocket motors, and their respective fuel grains. Although the term rocket motor is used primarily throughout this document, "rocket engine" and "gas generator" may be interchanged with this term.

Methods are provided herein for making a fuel grain section 100 for use in a rocket motor. These methods include blending a first energetic nanoscale metallic compound and a second compound suitable as a rocket fuel according to a predetermined mixture ratio to form a third feedstock material. In one example, a first energetic nanoscale metallic compound comprises tungsten, magnesium, copper oxide, copper, titanium, and/or aluminum. Also provided are methods of making a fuel grain section 100, including blending a first energetic nanoscale metallic compound and a second compound suitable as a rocket fuel. In other embodiments, the first energetic nanoscale metallic compound may be used in combination with a non-metal-based fuel, said non-metal-based fuel comprising a clean-burning fuel.

Figure 1:
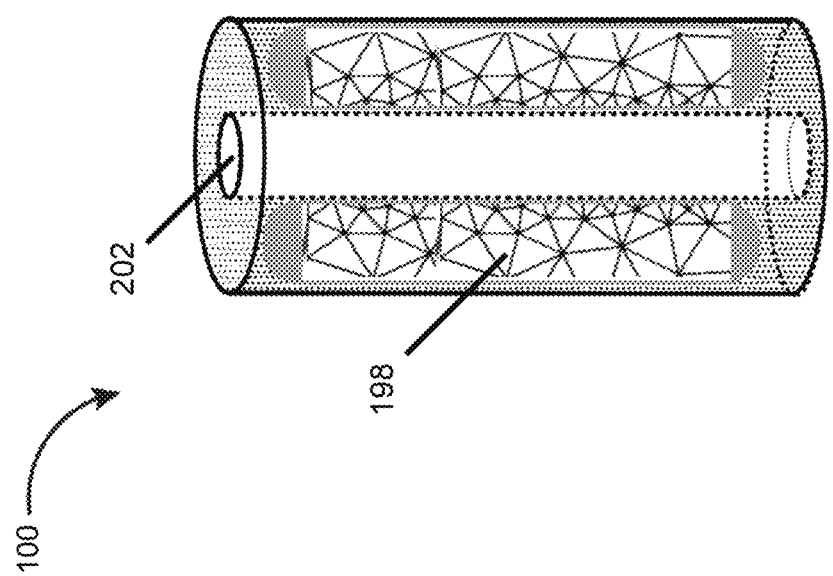
FIG. 1 shows a stochastic deposition simulation-assisted rocket fuel grain section according to one embodiment of the invention wherein spatial UGLs limit competitively simulated (and stochastically patterned) particle deposition to an area bounded by the central flow port and the external walls of the fuel grain section.
Figure 2B:
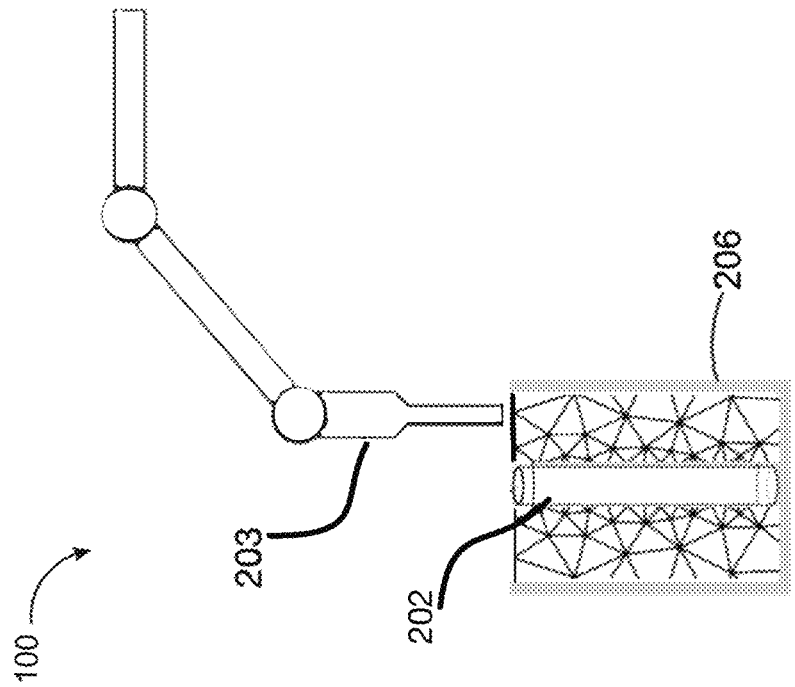
FIG. 2B depicts a competitive simulation-assisted fuel grain section and construction platform according to one embodiment of the present invention with spatial UGLs limiting nozzle deposition to an area bounded by a central flow port and the fuel grain external walls and wherein the stochastically patterned region or fuel grain sheath is composed of a plurality of radially displaced beads of different radii.
Figure 2A:
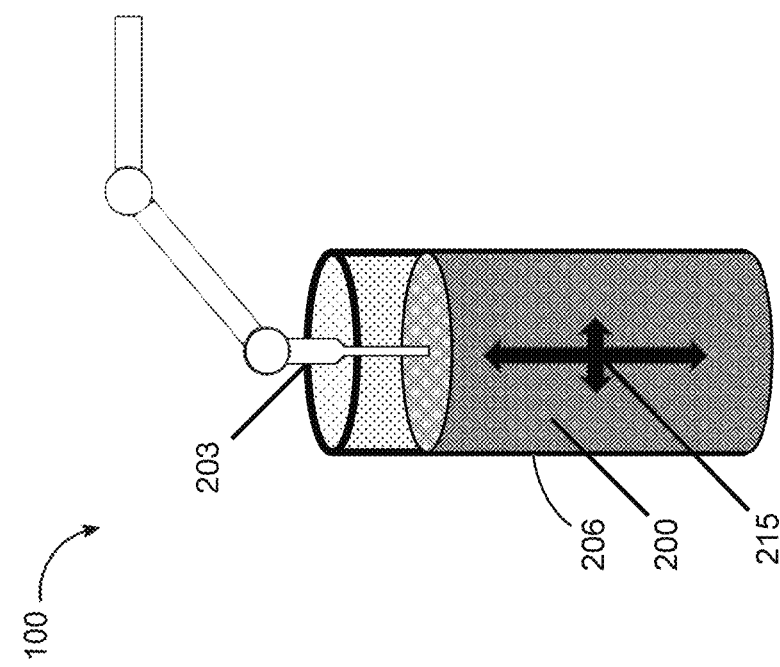
FIG. 2A depicts a fuel grain section and construction platform operatively engaged by an additive manufacturing apparatus that includes a nozzle, a central axis, and a rocket fuel grain section (i.e., architecture unassisted by competitive simulators) and wherein the fuel grain section is composed of energetic metallic compounds, rocket fuel, and agglutinated beaded structures of heterogenous radii.

Also provided below are various structural competitive simulation-assisted fuel grain elements, including those directed to fuel grain fabrication. FIG. 1, FIG. 2A, and FIG. 2B generally depict competitive simulation-assisted rocket motor fuel grains and rocket motor fuel grain construction platforms. As described above, FIG. 1A is a stochastic deposition simulation-assisted rocket fuel grain section 100, FIG. 2A is a fuel grain section 100 and rocket motor construction platform, and FIG. 2B is a competitive simulation-assisted fuel grain section 100 and construction platform depicting a deposition nozzle and central axis.

FIG. 1A is a fuel grain section 100 with a substantially cylindrical shape, also showing how spatial UGLs can limit fuel grain deposition patterns at the user's option. In one example, UGLs limit fuel grain deposition to an area exterior to the central flow port 202. Notably, the black and white patterns abutting the central flow port 202 represent a fuel grain sheath 198, as described above. In one embodiment, algorithmically optimized computer programs serve to enhance various rocket motor performance factors. In other embodiments, methods are providing user-generated stochastic deposition simulation limitations ("UGLs") and limiting fuel grain particle deposition patterns to an area bounded by the central flow port 202.

FIG. 2A is a fuel grain section 100 and construction platform operatively engaged by an additive manufacturing apparatus 203. The additive manufacturing apparatus 203 and construction platform includes a nozzle integrated into the additive manufacturing apparatus 203, a central axis 215, fuel grain external walls 206, and a standard rocket fuel grain material 200. The fuel grain material 200 is primarily composed of energetic metallic compounds, rocket fuel, and agglutinated beaded structures of heterogenous radii. FIG. 2B depicts several of the same elements, including a competitive simulation-assisted fuel grain section 100, however it also shows how nozzle deposition may be bounded by UGLs. In on embodiment, nozzle deposition is bounded by a central flow port 202 and the fuel grain external walls. As described above, this stochastically patterned region is composed of a plurality of radially displaced beads of different radii.

In one embodiment, an additive manufacturing apparatus 203 is operatively connected to a computing system configured to perform competitive simulations. Competitive simulation applications are provided, such as instruction sets and subroutines of a competitive simulation computer program. In one embodiment, the instruction sets and subroutines being stored on storage device and coupled to a computer, said instruction sets and subroutines being executed by one or more processors and one or more memory architectures provided within said computer. In one embodiment, competitive simulations further comprise game theory framework applications, wherein one or more variables are modified based on game theory to find equilibrium solutions for competing and/or cooperating metrics.

The present invention further comprises competitive simulations including stochastic deposition simulations, said stochastic deposition simulations producing optimized rocket fuel grains. In some embodiments, said rocket motor operation parameters improved by competitive simulation include at least hybrid fuel grain design, solid fuel grain design, and rocket flight aerodynamics. In other embodiments, deposition simulations are executed using one or more Graphical Processing Units. In other embodiments, stochastic deposition simulations are displayed using three-dimensional graphical rendering.

In other embodiments, permeable fuel grain pores are spatially deposited within the rocket motor as determined by a stochastic deposition simulations. In some examples, an additive manufacturing apparatus 203 deposits and blends deposition beads according to a stochastic deposition simulation. Similarly, additive manufacturing apparatus 203 instructions may be generated by any competitive simulation. Also provided are permeable fuel grain pores embedded in a rocket fuel grain, said pores being modeled before construction via competitive simulation. Alternately, said pores may be modulated in size and position during use via user-controlled sensors.

In other embodiments, a user may input "user-generated stochastic simulation limitations" ("UGLs") permitting a user to modify stochastic deposition simulation instructions. In one example, a UGL allows a user to introduce predetermined spatial boundaries into a stochastic deposition simulation. In particular, UGLs enable the input of spatial limits during competitive simulation resulting in an altered fuel grain architecture. In one example, stochastic deposition simulations are limited to deposition of fuel grain material along the external circumference of the central flow port, creating a circular fuel grain sheath. In other examples, the aforementioned fuel grain sheath produces circumferential thrust, said circumferential thrust representing downward thrust in a circular pattern at the post-ignition section of the rocket motor. In other embodiments, circumferential thrust serves to modulate rocket motor vortex flow via dampening of vortex flow. Notably, UGLs directed to vortex flow may offer a novel means for in-flight control of additively manufactured rocket motors.

In some embodiments, a wide array of UGLs are contemplated including those modulating fuel grain particle size in the competitive simulations. A particular example of a user-generated limitation is one directed to the tuning of fuel grain particle sizes, which among other results can tune the viscosity of the related materials. In some embodiments, fuel grain particle size distributions are monitored and modulated via competitive simulations such that flowability feedstocks are optimized while maintaining an overall given weight percentage of the output material. User-generated simulation limitations directed to tuning particle size is likely to result in the discovery of novel materials and flight characteristics as the quantity of novice rocket enthusiasts engaging said simulations proliferates.

Also provided are rocket fuel grains including agglutinated layers of solidified fuel grain forming a plurality of substantially concentric beads of heterogenous radii. In some embodiments, agglutinated layers are embedded with electrochemical sensors permeable fuel grain pores that may be modulated remotely to improve ballistics. In other embodiments, electrochemical sensors permit monitoring and modification of incendiary fluid flux and oxidizer flux such that the user may monitor fuel consumption while the rocket motor is in use. Also provided is a center flow port comprising a circular shape, an oval shape, a polygonal shape, a quatrefoil shape, a star shape, and/or an irregular shape.

In some embodiments, a fuel grain sheath is embedded with electrodes and sensors, facilitating rocket motor launch procedures or ignition and real-time monitoring of rocket flight. Particular examples of said sensors include LIDAR sensors, accelerometers, encoders, cameras, radar elements, GPS elements, acoustic elements, and/or magnetic sensor elements. In other embodiments, stochastic deposition simulations are adapted to optimize the design and real-time modulation of said electrodes and sensors.

Also provided herein are Acrylonitrile Butadiene Styrene (ABS) thermoplastics having a prearranged monomer composition. Typically, a predetermined mixture ratio is mixed with a third compound and/or a blended ABS thermoplastic with polymer-infused nanocomposite aluminum powder. In one example, a first compound comprises 95% by mass ABS thermoplastic and the second compound comprises 5% by mass polymer-infused nanocomposite aluminum powder. In some embodiments, fuel formulations with a ratio in a range from about 75% (ABS)/25% (nanocomposite aluminum) up to about 95% (ABS)/5% (nanocomposite aluminum) are utilized.

In some embodiments, ABS thermoplastic or compounded ABS-nanocomposite aluminum compound is extruded and placed to form each successive layer of radially displaced agglutinated ring-shaped beaded structures according to the chosen design of the solid fuel grain section 100, with each successive layer being extruded and disposed upon the preceding layer.

For the examples shown in the various figures described herein, the fuel grain is fabricated in a formulation of 95% by mass Acrylonitrile Butadiene Styrene (ABS), a thermoplastic possessing combustion characteristics desirable for hybrid rocket motor fuel and 5% NmX-01 nanocomposite aluminum produced by NanoMetallix, LLC, St. Louis, Mo. With a Young's Modulus of 2.0-2.6 GPa, ABS is 2020 times less elastic than HTPB and 38 times less elastic than paraffin wax, making it an ideal compound for fabricating a hybrid rocket fuel grain and its combustion chamber center port.

Also provided are production steps and equipment involved in the additive manufacture of hybrid rocket fuel grains made from a compounded formulation of ABS thermoplastic and highly energetic polymer-infused nanocomposite aluminum. Generally, energetic compounds are a class of compound with high amount of stored chemical energy that can be released. Highly energetic compounds include ultrafine aluminum powder, the particle size of which is in nanoscale. As shown in this exemplary example, ABS thermoplastic is compounded with polymer capped nanocomposite aluminum particles to a desired mixture ratio. As known by those skilled in the art, generally a nanocomposite is a compound comprising two or more constituent solids, the size of which measures 100 nanometers (nm) or less.

Ultra-high energetic nano particle size aluminum, especially aluminum powder produced without an aluminum oxide shell and passivated (by encapsulating or 'capping' the particle in a polymer shell) for safe handling and use, will increase fuel grain burning rate by as much as 50% using only a 5% concentration compared to a fuel grain fabricated in ABS with a 25% concentration of standard military grade 100 micron particle size aluminum.

Also provided is a second compound comprising a plurality of nanoscale elemental aluminum core particles encapsulated by a cap of oligomer polymer. Further provided is a second compound including a polymer-infused nanocomposite aluminum powder. Also provided is a second compound with a temperature maintained below: a heat deflection temperature, melting temperature, and ignition temperature of the second compound.

The feedstock material is formed by successive drying and heating of the feedstock, wherein said heating and physical manipulation of the feedstock causes an increases internal friction and consequent further elevation of the feedstock temperature. In some embodiments, successive drying and heating of the feedstock produces a preestablished viscosity that is highly adapted to use in an additive manufacturing apparatus 103.

In some embodiments, constructions of a hybrid rocket or solid rocket fuel grain are engineered and additively manufactured to both increase the amount of surface area available for combustion as a means to improve regression rate, to improve specific impulse, and to reduce fuel waste by inducing oxidizer axial flow within the center flow port 202 to allow more time for oxidizer and fuel gases (or oxidizer and entrained liquid droplets) to mix and combust more thoroughly. Notably, caution must also be taken to ensure that during blending, as well as during additive manufacturing, that the polymer capping compound which encapsulates the nanocomposite aluminum is not subjected temperatures above its heat deflection or melting temperature, nor the ignition temperature of the nano-scale aluminum particle core.

As each bead undergoes a phase change from either solid to gas or solid to entrained liquid droplet, an abutting radially displaced bead may be exposed to the flame sheet ("flame"). This process continues and persists during the hybrid rocket motor's operation until either oxidizer flow is terminated, or the solid fuel is exhausted. Unlike prior art constructions that improve regression rate by increasing the surface area exposed to the flame sheet using a multi-port architecture at the sacrifice of fuel loading, the solid fuel grain of the present invention presents increased surface area as a means to improve regression rate, but without the disadvantages associated with multi-port configurations.

Although the fuel grain section 100 may be manufactured in various sizes or dimensions, in this exemplary embodiment, the fuel grain section 100 has an outer diameter, d2, of 20.0 inches. In one embodiment, a wide range of diameters and fuel grain lengths (or sectional lengths) are contemplated. In one example, a center flow port 102 has an initial diameter, d1, of at least 6.0 inches. In another embodiment, the majority of stacked agglutinated layers in a given exemplary embodiment may have an approximate thickness ranging from 0.005 inches to 0.020 inches depending upon the additive manufacturing machine layer setting or extrusion nozzle used.

In this exemplary embodiment, each of the stacked layers is formed by the deposition of viscous polymer which is extruded following a roughly circular tool path forming a plurality of solidified abutting ring-shaped beads of compound. In one embodiment, ring shaped beads are solidified into an elliptical shape in cross sectional view, which ultimately flattens on its bottom under its own weight as the compound cools and flattens on the top as the weight of the next extruded layer of abutting ring shaped beads of compound is deposited above it.

In some embodiments, means are provided to ensure presentation of the fuel grain surface area to the flame section for combustion within the central flow port 202 in a manner which is persistent throughout the rocket motor's operation. In one example, an exemplary surface pattern presented to the flame section is characterized by a series of projections and depressions extending radially into the center port, in this case forming elongated ripples that extend axially through the center port. These ripples are present in each radially displaced circular ring-shaped beaded structure such that as one ring-shaped beaded structure is ablated, the next-presented ring-shaped structure is revealed, presenting the same geometric pattern, but with increased radii.

In some embodiments, agglutinated layers of the solid fuel grain section 100 may be formed on an agglutinated deposition type additive manufacturing machine with sufficient build scale and capability to produce entire fuel grains or sections which can be joined during post-processing. The agglutinated deposition method of 3D printing machine technology, originally developed by Stratasys, Inc., Eden Prairie, Minn., today is considered a generic form and can be found under other trademarked processes such as Fused Filament Fabrication or Plastic Jet Printing.

Also provided are examples of manufacturers of agglutinated deposition type machines, of sufficient scale, meeting these criteria include Cincinnati, Inc. of Harrison, Ohio; Stratasys, Inc., of Eden Prairie, Minn.; Cosine Additive, Inc., Houston, Tex.; and Thurmwood Corp., Dale, Ind. In addition to agglutinated deposition; there are a number of other additive manufacturing methods that can be employed to produce hybrid rocket fuel grains using a formulation of polymer and nanocomposite aluminum additive without departing from the spirit and scope of the present invention, including: Stereolithography, Selective Laser Sintering, Powder Bed Printing, and Inkjet Head Printing. Also provided are manufacturers producing distinct models of agglutinated deposition type additive manufacturing machines 203 in use today capable of processing thermoplastic solid fuel and (with the modifications as described below) a compounded formulation of thermoplastic and nanocomposite aluminum additive to fabricate a hybrid rocket motor fuel grain consistent with the present invention.

Also provided are exemplary methods for manufacturing the solid or hybrid fuel grain sections 100, the agglutinated deposition additive manufacturing process is performed in an additive manufacturing machine 203. In some embodiments, the machine 203 comprises two cartridge mechanisms. One cartridge stores a spool of ABS thermoplastic, or a compounded formulation of ABS and nanocomposite aluminum additive, that is used for fabricating the solid fuel grain. The second cartridge stores a spool of water-soluble disposable compound that is used to separate the solid fuel grain section 100 from a support base and support any overhanging structures specified in the design.

However, other types of additive manufacturing technologies that operate differently may be employed without departing from the spirit of the present invention. For example, the BAAM™, a giant-scale additive manufacturing system produced by Cincinnati, Inc., Harrison, Ohio does not feature a disposable support compound. Instead, a solvent sprayer is used to enable easy separation of the fuel grain from its base as well as any overhanging structures that are formed.

As each ring-shaped beaded structure cools and solidifies, a fusion bond develops between the radially displaced ring-shaped beaded structure, and as each plurality of such ring-shaped beaded structures forming layers cool and solidify, likewise a fusion bond develops between the layers. Once the solid fuel grain section 100 is additively manufactured in this manner, and removed from the agglutinated deposition additive manufacturing machine, any build support compounds can be either physically removed, or depending on the specific system employed, the fuel grain section can also be submersed into a water solution to dissolve any build support compound.

The additively manufactured solid fuel grain section 100 has a substantially uniform fuel grain density and is substantially free of voids. Furthermore, hybrid rocket fuel grains produced in this manner will normally require only minimal post-processing surface treatment. It is important to note that many additive manufacturing systems capable of producing hybrid rocket fuel grains consistent with the spirit and scope of the present invention employ different means to additively manufacture solid articles.

In other embodiments, instead of using line filament, the Cincinnati BAAM uses thermoplastic feedstock in pellet form, similar to those used in injection molding. Stereolithography employs a bath of liquid photo curable polymer and a UV laser to trace the tool path on its surface to cause the compound to solidify. Other additive manufacturing systems such as Selective Laser Sintering use a powder bed approach in which a fine layer of polymer powder is laid down to which a hot laser traces the tool path to solidify the compound.

In other embodiments, a flame section comprising a central flow port 202 is provided. In some embodiments, oxidizer (either a liquid or a gas) is injected along a pathway defined by the center flow port 202 of a hybrid or solid fuel grain, and flows within the center port 202, forming a boundary bordered by the center port 202 wall. In some embodiments, the boundary is structurally uncontrolled throughout a large portion of the length of the center port 202. In other embodiments, a flame section extends throughout the entire length of the center port 202 and depending upon the characteristics of the solid fuel selected, either causes a phase change to a gas or entrained liquid droplets of fuel to form.

In some embodiments, evaporation from the oxidizer/fuel gas/entrained liquid droplet interface produces a continuous flow of fuel gas that mixes with oxidizer gas at the flame section to maintain combustion along the exposed surface area of the center port 202 wall. At steady state, the regression rate of the melt surface and the gas-gas or gas-entrained liquid droplet interface is the same, and the thickness of the gaseous or entrained liquid layer is constant.

In other embodiments, the fuel grain section 100 of the present invention allows a smooth burning process. In some embodiments, as each radially displaced ring-shaped beaded structure is ablated, a new radially displaced ring-shaped beaded structure is presented to the flame section, illustrating ablation of the central flow port 202 at three different stages. In some embodiments, the burning process continues until either oxidizer flow is terminated or the solid fuel grain 100 compound is exhausted.

Even though the nano-scale aluminum particle cores are completely encapsulated in a polymer-based oligomer coating, and thus passivated, there remains the possibility that this highly energetic pyrophoric compound can still be reactive with oxygen or water vapor. As a safety precaution, the nanocomposite aluminum, the ABS thermoplastic, and the compounded ABS-nanocomposite compounds (i.e., the feedstock to the additive manufacturing apparatus 203) are stored in containers designed to store flammable compound, preferably infilled with a non-reactive noble gas at all times prior to their use as feedstock in an additive manufacturing process. In one application, the compounded feedstock is stored within a climate-controlled environment near the additive manufacturing apparatus 203.

According to one embodiment of the invention, during the fabrication process a heavier-than-air shielding gas is used to prevent trapping of atmospheric air within the fuel gain during 3D printing. Air trapped in the voids between beaded extrusions and between layers (can range from 5% to 15% depending upon the additive manufacturing apparatus 203 used) is not a problem for fuel grains made from thermoplastic or even when non-pyrophoric micron scale particle size aluminum is added to the formulation. However, atmospheric air (containing approximately 20% oxygen and varying amounts of water vapor, both of which are highly reactive with uncapped nanoscale aluminum particles) entrapped in a fuel grain containing nanocomposite aluminum could present a fire hazard due to the pyrophoric nature of the compound, should the polymer caps insulating the elemental aluminum core become compromised during production.

Thus, a pure heavier-than-air gas, such as argon, carbon dioxide, or nitrogen dioxide that is non-reactive to nanoscale elemental aluminum particle cores is used to cover the print bed and extruder during 3D printing as an added safety measure, particularly when the shielding gas is kept at a lower temperature to aide in the solidification process. In one example, gas trapped in voids will react when combusted within the rocket motor; thus the shielding gas should ideally contribute to combustion, or at minimum, be inert. For example, carbon dioxide will contribute oxygen to the combustion reaction whereas, argon being an inert noble gas will not. In other embodiments, each 3D printed fuel grain or fuel grain section is shrink-wrapped to encase the fuel grain or fuel grain sections in a thin plastic film to prevent atmospheric exposure prior to its use in a hybrid rocket motor.

Although the fuel grain section 100 may be manufactured in various sizes or dimensions, in one exemplary embodiment, the fuel grain section 100 has an external diameter, d, of not less than 21.0 inches. Although a wide range of diameters are possible, a competitive simulation-assisted fuel grain section 52 has an initial diameter, d1, of at least 3.0 inches in this exemplary embodiment. Each of the fuel coatings may have a thickness of up to 0.006 to 0.016 inches, with such coating thickness at least partially dependent on the particular competitive simulation-assisted coating construction apparatus used in manufacturing the competitive simulation-assisted fuel grain 100.

In another example, a stochastic deposition simulation may include one or more variables, wherein at least a portion of the one or more variables includes aerodynamic behavior, and wherein the stochastic deposition simulation is randomized, digital, and calibrated to equilibrate an optimized liquid fuel and/or gas fuel flux. The stochastic deposition simulation may be executed to generate one or more results of the stochastic deposition and flight simulation. At least a portion of the one or more variables using one or more optimization metrics on the one or more results of the stochastic deposition simulation, wherein at least the portion of the one or more variables may be modified based on game theory.

In some embodiments, the instruction sets and subroutines of an SD program, which may be stored on storage device, such as storage device, coupled to computer, may be executed by one or more processors and one or more memory architectures included within computer. In some embodiments, storage device may include but is not limited to a hard disk drive; a flash drive, a tape drive; an optical drive; a RAID array (or other array); a random access memory (RAM); and a read-only memory (ROM). In some embodiments, network may be connected to one or more secondary networks (e.g., network), examples of which may include but are not limited to: a local area network; a wide area network; or an intranet, for example.

Further to the above, a computing system may include one or more processors and one or more memories configured to perform operations comprising configuring, by a computing device, a stochastic simulation program, wherein the stochastic simulation program includes one or more variables, wherein at least a portion of the one or more variables includes agent behavior representing competing or cooperating metrics, and wherein the stochastic simulation program is randomized and digital. Further, executing the stochastic simulation program may be utilized to generate one or more results of the stochastic simulation program such as a solid fuel grain structure. In some examples, said solid fuel grain structure may be adaptable to existing rocket motor bodies known in the art, and application of said stochastic process may be directed to optimization of rocket motor ballistics profiles, flow of liquid and or gaseous fuel through the fuel grain, automated fuel grain blueprint creation optimizing fuel flow, electrostatic components, and the like.

In some embodiments, a computer may include a data store, such as a database (e.g., relational database, object-oriented database, triplestore database, etc.) and may be located within any suitable memory location, such as storage device coupled to a computer. In some embodiments, data, metadata, information, etc. described throughout the present disclosure may be stored in the data store. In some embodiments, the computer may utilize any known database management system such as, but not limited to, DB2, in order to provide multi-user access to one or more databases, such as the above noted relational database.

In some embodiments, the data store may also be a custom database, such as, for example, a flat file database or an XML database. In some embodiments, any other form(s) of a data storage structure and/or organization may also be used. In some embodiments, SD program may be a component of the data store, a standalone application that interfaces with the above noted data store and/or an applet/application that is accessed via client applications. In some embodiments, the above noted data store may be, in whole or in part, distributed in a cloud computing topology. In this way, a computer and storage device may refer to multiple devices, which may also be distributed throughout the network.

In some embodiments, a computer may execute a simulation application examples of which may include, but are not limited to, e.g., a stochastic deposition simulation application, a game theory framework application for solid and/or hybrid fuel grain geometry, or other application that allows for evaluation and solving of game theory over one or more agents. In some embodiments, the SD program and/or simulation application may be accessed via client applications. In some embodiments, SD program may be a standalone application, or may be an applet/application/script/extension that may interact with and/or be executed within simulation application, a component of simulation application, and/or one or more of client applications.

In some embodiments, simulation application may be a standalone application, or may be an applet/application/script/extension that may interact with and/or be executed within SD program, a component of SD program, and/or one or more of client applications. In some embodiments, one or more of client applications may be a standalone application, or may be an applet/application/script/extension that may interact with and/or be executed within and/or be a component of an SD program and/or simulation application.

Examples of competitive simulations may include, but are not limited to, e.g., a stochastic deposition simulation application, a game theory framework application, or other application that allows for evaluation and solving of game theory over one or more agents, a robot device application directed to rocket motors, a standard and/or mobile web browser, an email application (e.g., an email client application), a textual and/or a graphical user interface, a customized web browser, a plugin, an Application Programming Interface (API), or a custom application.

Here, competitive simulations directed to rocket motor fuel grain formation primarily focus on stochastic deposition simulations and/or game theory framework applications. In some embodiments, example client applications may include, e.g., SolidWorks, Mathematica, MATLAB, Actin toolkit from Energid Technologies of Cambridge, Mass., etc. The instruction sets and subroutines of client applications, which may be stored on storage devices coupled to client electronic devices and/or robot devices may be executed by one or more processors and one or more memory architectures incorporated into client electronic devices and/or robot devices.

In some embodiments, examples of robot devices may include, but are not limited to, e.g., a geo-based land, air, and space vehicle (e.g., rocket, plane, or unmanned air vehicles, etc.), a space exploration vehicle (e.g., lunar roving vehicle, robotic roving vehicles, etc.), an orbiting vehicle (e.g., satellite, rocket, etc.), and industrial robotic manipulator (e.g., multi-degree of freedom arm), or any other object capable of movement (autonomous or otherwise) via SD program. In other embodiments, robot devices may be capable of autonomous decision making with respect to hybrid fuel grain design, vortex flow optimization and/or dampening, aerodynamics optimization, and various other factors. Said robotic devices may interface with additive manufacturing platforms on land, but may also operate remotely while in orbit, on an asteroid, comet, planet, moon, etc.

In a first alternative embodiment, the system further comprises the continuous vacuum processing of solid composite rocket propellant. Solid composite rocket motors typically undergo a substantial degassing procedure before they are cast into their final motor casing. Degassing is a critical step in the motor fabrication process as it ensures the resulting rocket motors have the expected properties, such as density, and expected burn profile when they are put into service. As lead times and costs for traditional methods of fabricating rocket motors has risen, the need for alternative manufacturing methods has developed. This embodiment summarizes a process to continuously process and deposit energetic materials under vacuum. The process starts with metered dispensation of materials into a mixer and ends with additively manufactured rocket propellant that was under vacuum during the entire operation.

In summary, this embodiment provides for the raw materials for the rocket propellant to first be stored in hoppers. The propellant raw materials, with the exception of the curative agent, flow at metered rates into a twin-screw auger mixer where the raw materials are mixed. The mixing is performed under vacuum due to a vacuum port in the twin-screw mixer. "Vacuum" in this embodiment refers to any pressure below atmospheric pressure. In one example, propellant samples are passed through a vacuum chamber at about −28 inches Hg pressure for 30-60 second increments (~2 increments) for degassing purposes. Metered dispensation allows the propellant to flow from the twin-screw auger mixer into the hopper of a progressive cavity pump. The progressive cavity pump will push the propellant through the remainder of the system, until it is deposited into a rocket motor case. The propellant remains under vacuum through the remainder of the process, without introducing air as the material flows. The print platform is also under vacuum so the final material as it is printed is still not exposed to the atmosphere. This system may also be applied with vacuum on individual stages, or the entire processing system as necessary. While the term propellant is used here, this process could be used for movement of any material for which introduction of or exposure to an ambient environment would be detrimental.

In a more technical description of this first alternative embodiment, it is first noted that solid composite rocket propellant is typically made up of a powdered oxidizer, powder metallic fuel, and a curable polymeric binder. Additional polymer additives, such as plasticizer, cure catalysts, burn rate modifiers, or mechanical stabilizers may be added to the propellant. In traditional manufacturing processes, propellant is mixed in large industrial mixers and undergoes substantial degassing procedures before being cast into its motor casing. Here, a procedure to streamline the manufacturing process by mixing, pumping, and depositing the propellant under vacuum is outlined.

Figure 3:
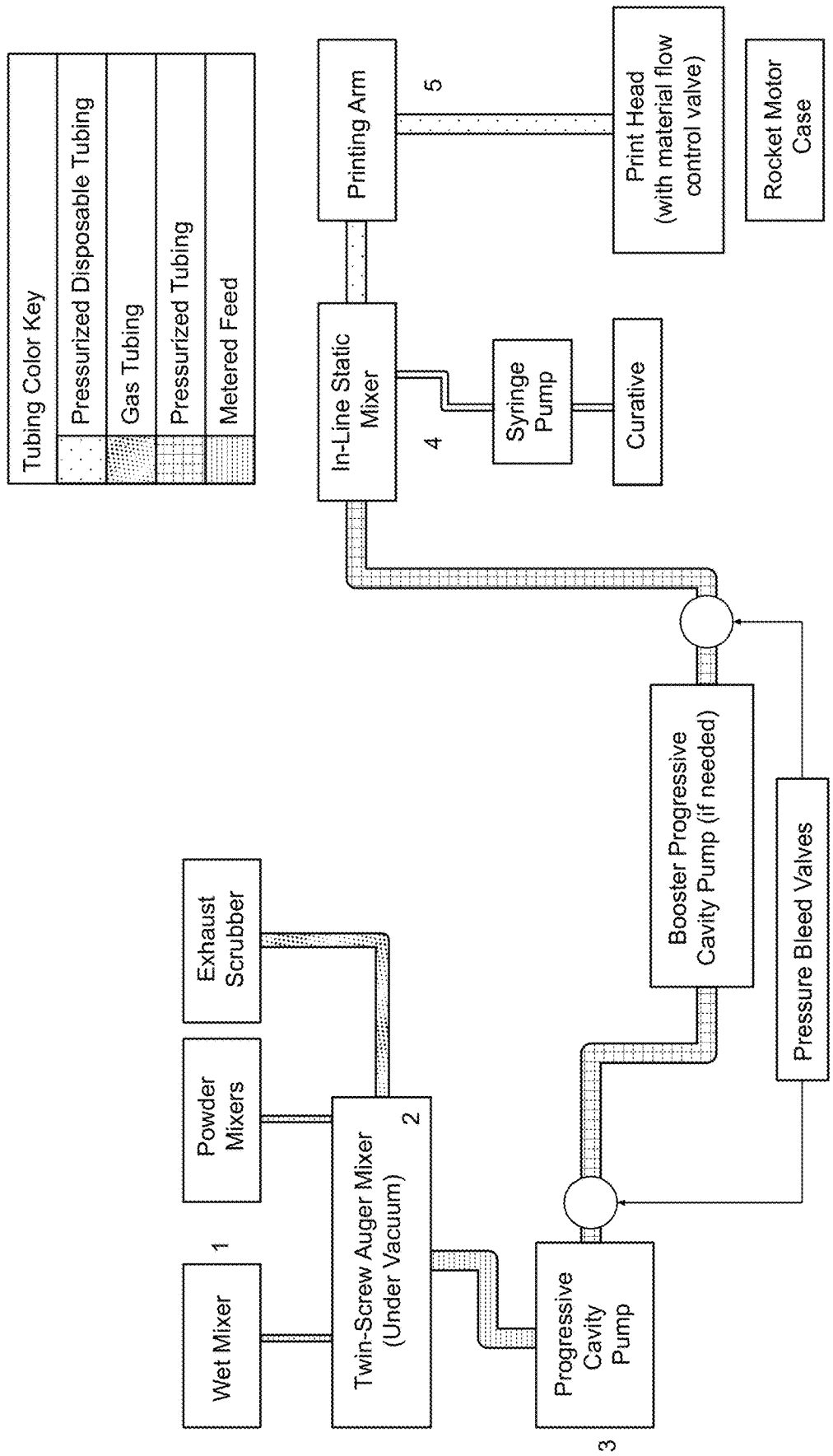
FIG. 3 depicts a flowchart of a continuous additive manufacturing system for rocket propellant with inline (static) mixing identified at 4.

The process for continuously and autonomously mixing propellant under vacuum is given is depicted in FIG. 3. The process preferably occurs in stages, which are summarized as (1) raw materials being dispensed into a mixer, (2) propellant pre-mix being formed by mixing the materials in a twin-screw auger mixer under vacuum, (3) propellant pre-mix being fed into a progressive cavity pump and pumped through a system until it is (5) deposited into a motor casing or as a free-standing print. Additional liquid materials may be added to the system at stage (4) via a syringe pump and in-line/static mixer.

To make the process possible, several key pieces of technology are combined to mix and pump propellant materials under vacuum. In Stage 1, automated dispensers allow the wet chemicals and dry powders to be dispensed in into the mixer. They may be individual chemicals or suspensions of powdered materials (such as oxidizer and fuel) in the wet materials (binder).

Mixing occurs in stage 2 and may be performed by a twin-screw auger mixer, also known as a helicone mixer, such as that available by Design Integrated Technology, Inc. of Warrington, VA. Vacuum ports draw air out of the system during the mixing process. Material leaves the port on the bottom of the mixing bowl and connects via transfer tubing and sanitary quick connects into the hopper of a progressive cavity pump, such as that available by SEEPEX GmbH of Bottrop, Germany. The hopper itself is preferably sealed from the environment to allow vacuum conditions to be applied.

From the progressive cavity pump to the print head, the propellant is contained within a tube, so vacuum conditions are maintained. The static mixing stage, shown as stage (4) in FIG. 3, is an inline mixing process that allows mixing of a liquid component to the propellant mixture. This stage is described in detail below.

To prevent air entrainment to the propellant, final extrusion of the propellant material through the print head is performed under vacuum. This step involves containing the entire printing apparatus within a vacuum environment or establishing a local vacuum containment around the printhead and the print platform. The printed material may be deposited into a containment vessel such as a motor casing or can be deposited free-standing onto a platform.

The entire vacuum sealed system prevents air entrainment and exposure during processing. Each stage described may be maintained under varying degrees of vacuum to enable the appropriate conditions. It is proposed that one or more stages will need to be maintained at vacuum conditions to provide the desired output, but reducing the extent of the vacuum stages necessary simplifies operation.

Applications for this first alternative embodiment include additive manufacturing process for energetic or explosive materials, additive manufacturing process for materials systems that cannot be exposed to air, autonomous manufacturing methods for materials that cannot be exposed to air. Advantages include the fact that the mixing and pumping of the propellant under vacuum means that air will not be introduced into the system at any point, removing the need for degassing procedures before the material is deposited into its final casing.

In a second alternative embodiment, the system further comprises the continuous processing of solid rocket propellant with a syringe pump and an inline/static mixer in an additive manufacturing system. It is known that solid composite rocket motors are typically made through a labor-intensive cast and cure process. As lead times and costs for production of the motors has continued to rise, a need for faster, agile fabrication techniques has developed. Such novel fabrication techniques could involve continuous mixing and pumping of the propellant through an additive manufacturing-type system. This must to be done without causing the propellant to cure in the additive manufacturing machine.

Here, a solution is developed that allows the solid rocket propellant to flow safely through the machine and start the cure process as it exits the machine and is deposited into the rocket motor case. This is accomplished by combining an in-line/static mixer with a syringe pump to add curative to the rocket propellant and fully mix it through a tube before the complete propellant is deposited into the rocket motor casing.

In summary, this embodiment provides for the injection of the curing component of a materials slurry in-line into a continuous manufacturing system. As material flows through a continuous system, a syringe will inject the curing agent into the slurry as it flows through a static mixer. The static mixer includes internal mixing vanes that cause the material to be mixed as it flows through the component. A static mixer is a mixer with stationary internal baffles. Pressurized material moves around the stationary internal baffles and mixes as it flows through the length of the static mixer.

This mixing step ensures complete mixture of the main slurry component and the injected liquid, all while remaining contained with no gas entrainment (vacuum conditions). This inline mixing enables continuous system operation. The inline mixing also sets where in the process the curative is injected, and thus a point after which all material will set. For the continuous operation proposed the material upstream of this static injection of the curing component will not cure and thus can be left in the system for subsequent operations. Downstream of this location the material must be flushed, or components replaced to remove cured material.

The novel application described with respect to this second alternative embodiment allows the continuous processing of propellant in this printing system. This component also enables a re-usable setup and limits waste in the processing of the propellant.

Figure 4:
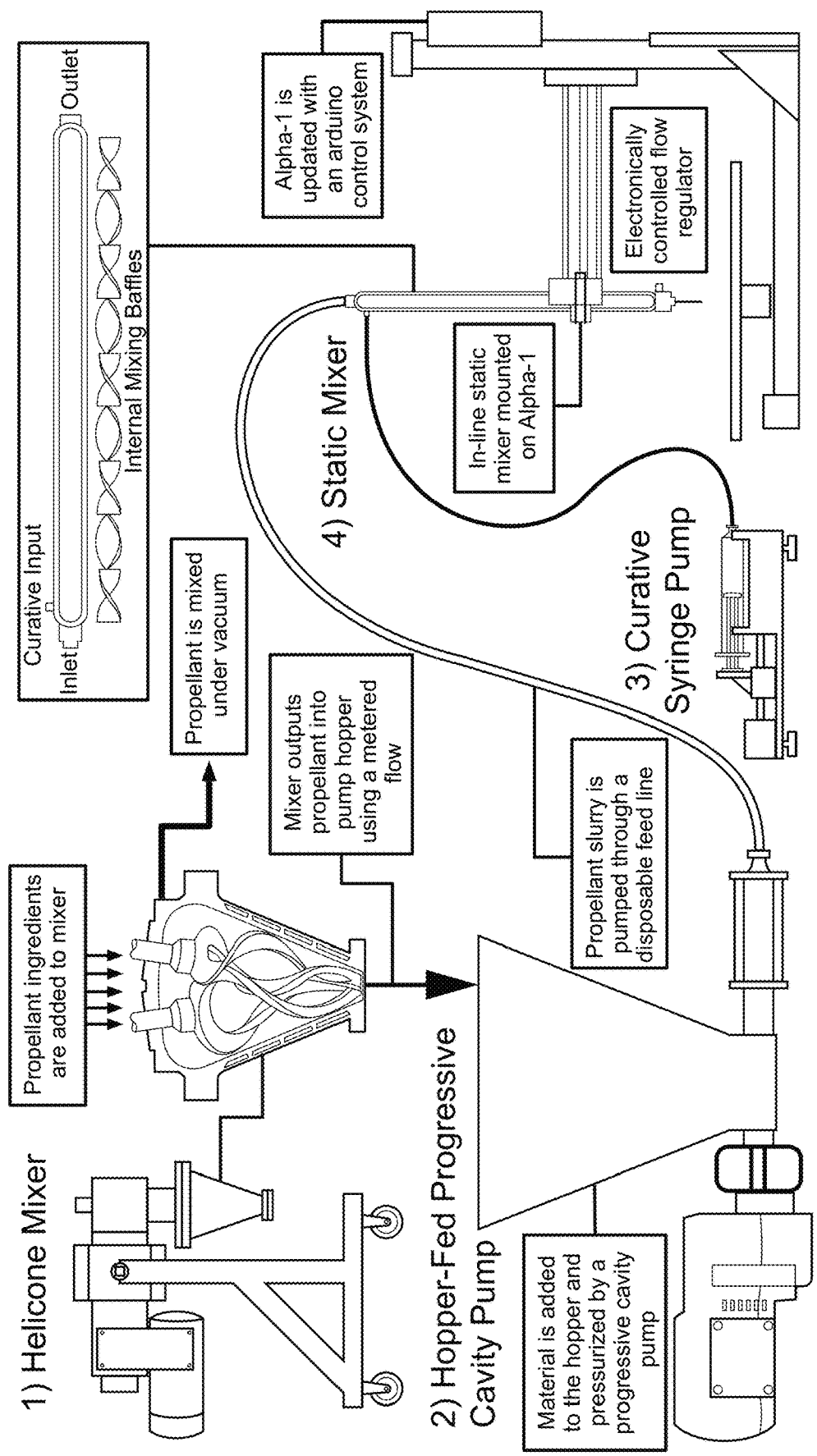
FIG. 4 depicts a flowchart showing an overview of a continuous mixing system for additive manufacture of rocket propellant, with the inline/static mixer component at items 3 and 4.

An overview of the proposed propellant continuous additive manufacturing system is shown in FIG. 3 and a more detailed identification of components is shown in FIG. 4. The main goal of this system is continuous additive manufacture of a rocket propellant, or other high-viscosity slurry material. The continuous processing requires that the system is able to introduce and combine multiple materials, including the chemicals required to affect the chemical cure of the propellant mixture.

The use of the static mixer allows the system to operate continuously but also enables successive printing operations with limited waste. The propellant printing process requires that all components of the propellant mixture are combined and ultimately cured into a printed shape or structure. The cure process that is implemented here is a chemical cure of the HTPB binder material with a curative. The system implementation here has the HTPB mixed with the main propellant components (solid ammonium perchlorate, solid aluminum, other potential additives including cure rate catalysts) in section 1 of FIGS. 3 and 4. The curative component is then added to initiate the chemical cure. Here it is proposed that this curative is injected and mixed to the system using the inline/static mixer.

The use of the static mixer to inject the curative at the location in the process identified determines the location in the continuous process after which the material in the line will chemically cure. For a continuous additive manufacturing process, the rate of injection of the curative and amount of embedded catalyst broadly determines the amount of time that it will take for the mixture to chemically set. This in turn sets the working length and printing speed combinations (i.e., pot-life) for the system. These pot-life parameters are critical to the effective printing of the material in terms of having sufficient mechanical strength to be printed, and also to resist slump or support subsequent layers that will be printed on top of it.

In the context of a continuous printing system, the implementation of the curative injected through a static mixer allows only a portion of the material to begin the chemical cure process. The material that is mixed upstream of the curative injection will not chemically cure, and thus can be left in the line for long periods of time. The material downstream of the injection will be exposed to the curative and will become chemically cured. For a continuous operation the inline cure is not a concern but becomes a concern when the system stops for a period of time between individual print processes. This mixing device allows the material upstream of the static mixer to be reused while components and material downstream will be discarded for subsequent prints, thereby significantly reducing material waste by not requiring that all of the propellant in the system be disposed of.

The inline mixing system itself may be cleaned by stopping injection of the curative and continuing flow of the main propellant slurry. The static mixing section will be cleared of curative after a few (approximately 5, but in some embodiments any number less than five or any number more than five) volume exchanges to a level sufficient to prevent any curing of propellant in the mixer itself . . . .

For the application of rocket motor production, this mixing approach eliminates the entrainment of atmospheric air which can cause voids in the final propellant. This enclosed mixing prevents the voids and increases the performance of the propellant.

For the chemicals used in the current curing process, the Isophorone diisocyanate (IPDI) or other chemical curative is hazardous for humans to inhale. This operational approach of the static mixer maintains the curative enclosed in a syringe injection directly to the static mixer to prevent any safety issues. Once the curative has been mixed with the HTPB the exposure hazard is essentially zero. This inline mixing process thus significantly reduces the physical chemical hazards involved in the rocket motor manufacturing process.

In use, this second alternative embodiment may be applied to any curing polymer/chemical slurry in an additive manufacturing system, any curing polymer/chemical slurry in a continuous manufacturing system, continuous or additive manufacturing of energetic materials, continuous or additive manufacturing of explosive materials. Advantages of this second alternative embodiment are that it allows for infinite pot-life of the any uncured chemical slurry to be in an additive manufacturing system, and it allows for vacuum or no external environment processing and addition of components.

In a third alternative embodiment of the invention, particle size distribution variations are proposed for 3-D printing solid composite rocket propellant. It is known that to develop a system to continuously, additively manufactured solid rocket motors, a large volume of a high solids loading slurry material must be moved effectively. The transport of high solids loading slurries is a complicated process that generally requires large pressure differentials or active transport through auger type systems. Moreover, applying these systems to rocket propellant chemicals can be dangerous.

This third alternative embodiment provides for the modification solid loading via particle size distributions in the slurry to reduce the overall viscosity of the slurry, and ultimately enable simpler pumping methods. The particle size distribution of the slurry affects the viscosity, printing parameters such as slump, and ultimately propellant burn rate. The ideas described here allow continuous variation in slurry composition, rheology, deposition characteristics, and burn rate of propellants.

It is known that the movement of high solid loading slurries typically requires large pressure differentials or mechanical motion (provided by an auger, for example) for continuous flow systems. The proposed methodology is to tune the particle size distributions of the slurry of interest to adjust the overall viscosity of the material. The particle size distribution is changed in terms of the relative percentage of particles of individual diameters to tune the flowability of the slurry while maintain an overall given weight percentage of the output material. The goal is to enable continuous additive manufacturing with a slurry containing solid particles with greater than ~80% solids by mass.

An example propellant composition includes: 72.6% by weight ammonium perchlorate (with 26.7% by weight particles of size 90 mm (37% of ammonium perchlorate particles) and 45.9% by weight particles of size 400 mm (63% of ammonium perchlorate particles)), 15.6% by weight aluminum particles (3 mm diameter) and 11.9% by weight additional materials (binder, curative, catalyst, plasticizer). The overall composition is considered here to be a slurry with a high solids loading.

The mechanical properties of a slurry of interest for additive manufacturing include viscosity, resistance to slump, and overall particle packing density. Additionally, the burn rate of a material is of interest for rocket propellants, which are the targeted printed materials as described in this invention disclosure. These mechanical properties, and others, are all functions of the material itself. When the material is made of individual solid particles, the mechanical properties, including burn rate, are all functions of the solid particle loading conditions.

This embodiment describes tuning particle size characteristics to adjust overall slurry output properties, including burn rate and viscosity. The incorporation of tuning particle size into the developed continuous additive manufacturing system allows the potential for a continuous variation in the mechanical properties and also burn rate characteristics as a rocket motor is produced. This enables a wide variety of printing applications and output motor profiles.

Applications of this third invention include use with respect to the additive manufacturing of propellants, the slurry processing of high solids loading materials, the continuous additive manufacturing of concrete type materials or materials with varied particle size distributions, and the pumping high solids loaded materials. Advantages include the reduction of viscosity of material to enable printing with lower pressure, the enabling of a variable burn rate, and the enabling of variable mechanical properties important for additive manufacturing including viscosity, slump, and mechanical stability.

One of ordinary skill in the art will recognize that additional embodiments are also possible without departing from the teachings of the present invention or the scope of the claims which follow. This detailed description, and particularly the specific details of the exemplary embodiments disclosed herein, is given primarily for clarity of understanding, and no unnecessary limitations are to be understood therefrom, for modifications will become obvious to those skilled in the art upon reading this disclosure and may be made without departing from the spirit or scope of the claimed invention.

Although the invention has been shown and described with respect to a certain preferred embodiment, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any particular application.

We claim:

1. An apparatus for making a fuel grain for use in a rocket motor or gas generator, comprising:
   a blending unit configured to blend a first energetic nanoscale metallic compound and a second compound suitable as a rocket fuel to form a third compound, wherein the third compound serves as feedstock material;
   a feedstock formation unit configured to form the feedstock material by successive drying and heating of the feedstock, wherein the heating increases internal friction of the feedstock, further elevating the feedstock temperature, and wherein successive drying and heating of the feedstock produces a preestablished viscosity that is highly adapted to use in an additive manufacturing apparatus;
   a competitive simulation computer program running on a computing system operatively connected to the additive manufacturing apparatus and configured to perform competitive simulations, and wherein the instruction sets and subroutines of the competitive simulation computer program are stored on a storage device and coupled to a computer, the instruction sets and subroutines being executed by one or more processors and one or more memory architectures provided within the computer;
   wherein the competitive simulations provide optimized rocket motor fuel grains and rocket motor operation parameters, and the fuel grains form agglutinated layers of solidified fuel grain embedded with permeable fuel grain pores having a modulatable diameter, the modulatable diameter in turn modifying rocket motor ballistics profiles; and
   a stochastic deposition simulation unit configured to spatially deposit the permeable fuel grain pores within the rocket motor as determined by stochastic deposition simulations.

2. The apparatus of claim 1 further comprising a user interface unit configured to allow a user to modulate the diameter of the permeable fuel grain pores.

3. The apparatus of claim 1 further comprising a continuous print processing unit.

4. The apparatus of claim 1 wherein said rocket motor operation parameters comprise at least hybrid fuel grain design, solid fuel grain design, automated launch abort systems, electrochemical sensor integrity, and flight aerodynamics.

5. The apparatus of claim 1 wherein the first energetic nanoscale metallic compound comprises Acrylonitrile Butadiene Styrene (ABS) thermoplastic having a prearranged monomer composition.

6. The apparatus of claim 1 wherein the second compound comprises a plurality of thermoplastic nanoscale elemental aluminum core particles encapsulated by oligomerized polymers.

7. The apparatus of claim 1 wherein the second compound comprises a polymer-infused nanocomposite aluminum powder.

8. The apparatus of claim 1 further comprising electrochemical sensors embedded within the agglutinated layers of solidified fuel grain, wherein the sensors permit monitoring of at least incendiary fluid flux and oxidizer flux.

9. The apparatus of claim 1 further comprising simulation further comprises stochastic deposition simulations, said stochastic deposition simulations producing said optimized rocket fuel grains.

10. The apparatus of claim 9 wherein said agglutinated layers of solidified fuel grain comprise a plurality of substantially concentric beads of heterogenous radii, and wherein the additive manufacturing apparatus deposits and mixes said beads according to additive manufacturing apparatus instructions generated by said stochastic deposition simulation.

11. The apparatus of claim 9 wherein stochastic deposition simulation parameters including spatial deposition boundaries are modified by user-generated stochastic simulation limitations.

12. The apparatus of claim 11 wherein said user-generated stochastic simulation limitations define a central spatial deposition boundary, thereby restricting fuel grain deposition to an external circumferential area encasing the center flow port, wherein said circumferential deposition is provided by said stochastic deposition simulation, and wherein said circumferential deposition forms a fuel grain sheath, said fuel grain sheath encasing the center flow port.

13. The apparatus of claim 12 further comprising a circumferential thrust produced by said fuel grain sheath, whereby said circumferential thrust substantially reduces rocket motor vortex flow; and wherein a user may utilize said reduction in rocket motor vortex flow in order to modify rocket flight characteristics.

14. The apparatus of claim 13 further comprising embedded electrodes and sensors in said fuel grain sheath.

15. The apparatus of claim 14 further comprising wherein the first energetic nanoscale metallic compound comprises 95% by mass ABS thermoplastic and the second compound comprises 5% by mass polymer-infused nanocomposite aluminum powder.

16. The apparatus of claim 15 further comprising further comprising tuning the viscosity of the feedstock material via adjustments to a particle size of the feedstock material.

17. An apparatus for making a fuel grain for use in a rocket motor, comprising:
  a. a blending unit configured to blend a first energetic nanoscale metallic compound and a second compound suitable as a rocket fuel to form a third compound used as a feedstock material for an additive manufacturing apparatus;
  b. an additive manufacturing apparatus operatively connected to a computing system, the computing system configured to perform stochastic deposition simulations for optimizing fuel grain architectures wherein the stochastic deposition simulations provide additive manufacturing printing instructions to the additive manufacturing apparatus, allowing construction of an optimized rocket fuel grain section;
  c. a plurality of agglutinated layers of solidified fuel grain compound at least partially making up the optimized rocket fuel grain section, each agglutinated layer comprising permeable fuel grain pores having a diameter;
  d. a user interface unit configured to allow a user to modulate the diameter of the permeable fuel grain pores to modify rocket motor ballistic profiles; and
  e. a stochastic deposition simulation unit executed using one or more Graphical Processing Units, determining the spatial deposition of the permeable fuel grain pores within the rocket motor.

18. The apparatus of claim 17 wherein the first energetic nanoscale metallic compound is selected from the group consisting of tungsten, magnesium, copper oxide, copper, titanium, and aluminum.

19. The apparatus of claim 17 wherein the first energetic nanoscale metallic compound is used in combination with a non-metal-based fuel.

20. An apparatus for making a fuel grain for use in a hybrid rocket motor, comprising:
  a. a blending unit configured to blend a first energetic nanoscale metallic compound and a second compound suitable as a rocket fuel to form a third compound;
  b. a temperature control and feedstock formation unit configured to maintain a temperature of the second compound below a heat deflection temperature, melting temperature, and ignition temperature of the second compound, wherein the third compound serves as feedstock material that is dried and heated; wherein the heating and continued manipulation of the feedstock cause an increase in internal friction to a preestablished viscosity highly adapted to use in an additive manufacturing apparatus;
  c. an additive manufacturing apparatus operatively connected to a computing system, the computing system configured to perform competitive simulations comprising game theory framework applications and stochastic deposition simulations, the stochastic deposition simulations producing a plurality of agglutinated layers of rocket fuel grain and an improved ballistics profile;
  d. permeable fuel grain pores embedded in the lawyers, the pores having a diameter that may be modulated by a user to modify the ballistics profiles;
  e. a user interface unit configured to allow a user to modulate the diameter of the permeable fuel grain pores; and
  f. whereby the spatial deposition of the permeable fuel grain pores within the rocket motor determined by the stochastic deposition simulations.

* * * * *